United States Patent [19]

Bishop et al.

[11] Patent Number: 4,901,231

[45] Date of Patent: Feb. 13, 1990

[54] EXTENDED PROCESS FOR A MULTIPROCESSOR SYSTEM

[75] Inventors: Thomas P. Bishop, Aurora; Mark H. Davis, Warrenville; Grover T. Surratt, West Chicago, all of Ill.

[73] Assignees: American Telephone and Telegraph Company, New York, N.Y.; AT&T Information Systems, Inc., Morristown, N.J.

[21] Appl. No.: 944,586

[22] Filed: Dec. 22, 1986

[51] Int. Cl.$^4$ .............................................. G06F 15/16
[52] U.S. Cl. .................................. 364/200; 364/230.3; 364/284
[58] Field of Search ... 364/200 MS File, 900 MS File, 364/200, 300, 900

[56] References Cited

U.S. PATENT DOCUMENTS

| | | | |
|---|---|---|---|
| 3,593,300 | 7/1971 | Driscoll, Jr. | 364/200 |
| 4,412,285 | 10/1981 | Neches et al. | 364/200 |
| 4,495,570 | 1/1985 | Kitajima et al. | 364/200 |
| 4,530,051 | 7/1985 | Johnson et al. | 364/200 |
| 4,543,626 | 9/1985 | Bean et al. | 364/200 |
| 4,547,849 | 10/1985 | Loure et al. | 364/200 |
| 4,564,901 | 1/1986 | Tomlinson et al. | 364/200 |
| 4,703,420 | 10/1987 | Irwin | 364/200 |
| 4,731,736 | 3/1988 | Mothersole et al. | 364/900 |

OTHER PUBLICATIONS

K. Hwang et al., "A Unix-Based Local Computer Network with Load-Balancing", Computer, Vol. 15, No. 4, April, 1982, pp. 55–65.
R. M. McKeag et al., "Studies in Operating Systems", 1976, Academic Press, London, Great Britain, pp. 27–35.
A. Faro et al., "Theory and Implementation of Distributed System Management", April, 1986, IEEE INFOCOM '86, Fifth Annual Conference, Computers and Communications Integration Design, Analysis Management, Miami, Florida, pp. 405–414.
Olson, Robert; "Parallel Processing in a Message-Based Operating System", IEEE Software, July, 1985, pp. 39–49.
AT&T Book, Chapter 13, Copyright 1986, pp. 413–431, "The Design of the UNIX ® Operating System", Maurice J. Bach.
Sun Microsystems, Inc. Manual, Jan., 1985, pp. ii–12, "Remote Procedure Call Protocol Specification".
Electronics Article, July, 1983, pp. 118–124, "Unix Variant Opens a Path to Managing Multiprocessor Systems", Paul Jackson, Convergent Technologies, Santa Clara, Ca.
Thesis, May, 1981, "Remote Procedure Call", Bruce Jay Nelson, Serial No. 416,649, filed Sept. 10, 1982.

Primary Examiner—Raulfe B. Zache
Assistant Examiner—Jonathan C. Fairbanks
Attorney, Agent, or Firm—John C. Moran

[57] ABSTRACT

In a multiprocessor system, a program's execution that is controlled by controlling an extended process that spans a plurality of processors. The extended process comprises an user process on one processor for executing object code of the program and stub processes each on an individual one of said remaining processors for accessing system resources required for execution of the program. Each stub process gives the extended process access to the resources associated with the processor executing the stub process. Further, a stub process is unique to one particular extended process. Each stub process is interconnected to the user process by an individual virtual communication channel. The virtual communication channels are identified in each process by a port table that is unique to an individual process. When the user process accesses a local file, the access is through a user file table, a system file table, and an inode table. When the user process accesses a remote file, the access is through the port table, over the virtual channel identified from port table to a stub process, and then through the stub process' user file table, system file table, and inode table.

16 Claims, 6 Drawing Sheets

EXTENDED PROCESS FOR A MULTIPROCESSOR SYSTEM

CROSS REFERENCE TO RELATED APPLICATION

Concurrently filed herewith and assigned to the same assignee as this application are:

T. P. Bishop, et al., "InterProcessor Communication Protocol", Ser. No. 941,702.

T. P. Bishop, et al., "Virtual Execution of Programs on a Multiprocessor System", Ser. No. 941,700 now U.S. Pat. No. 4,849,877; and T. P. Bishop, et al., "Controlled Dynamic Load Balancing for a Multiprocessor System", Ser. No. 941,701.

TECHNICAL FIELD

Our invention relates to computer operating systems and more particularly to an extended process that is active on a plurality of processors simultaneously.

BACKGROUND OF THE INVENTION

The problem of controlling the allocation of resources in a distributed or multiprocessor system is well known. Multiprocessor systems fall into one of two categories: tightly coupled multiprocessor systems or distributed architecture multiprocessor systems. In a tightly coupled multiprocessor system, the processors share common memory and kernel data structures and schedule processes from a common pool. In a distributed architecture multiprocessor system, the processors are pooled to allow resource sharing but each processor retains autonomy over its own environment. Each processor or computer is an autonomous unit consisting of a CPU, memory, and peripherals. A computer can be used in the distributed architecture even though it does not have local file storage. The most important feature that distinguishes distributed systems from tightly coupled systems is that the physical memory available to each machine is independent of activity on other machines. Consequently, the kernels on each machine are independent, subject only to the external constraints of running in a distributed environment. There are three major types of distributed systems. The first type is satellite systems which are tightly clustered groups of machines that are centered on one machine. Normally, the center machine is a larger machine. The satellite processors share the process load with the center processor and refer all system calls to it. The purpose of a satellite system is to increase system throughput and, possibly, to allow dedicated use of a processor for one process in a UNIX system environment. The system runs as a unit; unlike other models of the distributed system, satellite processors do not have real autonomy except, sometimes, in process scheduling and in local memory allocation.

Newcastle distributed systems are the second type of system. A Newcastle distributed system allows access to remote systems by recognizing the names of remote files in the C library. The remote files are distinguished by special characters embedded in the path name or by special path component sequences that proceed the file system route. This method can be implemented without making changes to the kernel and is therefore easier to implement then the other types of systems, but is less flexible. The final type of distributed system is the transparent distributed system. The latter system allows standard path names to refer to files on other machines; the kernel recognizes that the files are remote. Path names cross machine boundaries at mount points, much as they cross file system mount points on disks.

The satellite architecture provides a configuration that improves system throughput by offloading processes from the central processor and executing them on the satellite processors. Each satellite processor has no local peripherals except for those it needs to communicate with the central processor. Each process on a satellite processor has an associated stub process on the central processor. When a process on a satellite processor makes a system call that requires services provided only by the central processor, the satellite process communicates with its stub process on the central processor to satisfy the request. The stub process executes the system call and sends the results back to the satellite processor. The stub process is created when the process is assigned to the satellite processor. The problem with the satellite architecture is that all system calls involving external files or devices must be handled by the central processor thus slowing down the throughput of the system. Further information concerning the satellite architecture may be found in the article by Birrel, et al., "Implementing Remote Procedure Calls", ACM Transactions on Computer Systems, Vol. 2, No. 1, Feb. 1984, pp. 39-59.

In the Newcastle architecture, the kernel does not participate in determining that a file is remote; instead, C library functions that provide the kernel interface detect that a file access is remote and take the appropriate action. For both naming conventions, the C library parses the first components of a file name to determine that a file is remote. The problems associated with the Newcastle architecture are as follows. System performance may be degraded. Because of the larger C library, each process takes up more memory even though it makes no remote references; the library duplicates kernel functions and takes up more space. Local requests may execute more slowly because they take longer to get into the kernel, and remote requests may also be slow because they have to do more processing at user level to send requests across a network. Finally, programs must be recompiled with new libraries to access remote files; old programs and vendor supplied object modules do not work for remote files unless recompiled. The problem then with the Newcastle architecture is that it is not transparent to the user.

The transparent distributed architecture has a pool of server processes and assigns them temporarily to handle each remote request as it arrives. After handling a request, the server process re-enters the pool and is available for assignment to other requests. The server process does not remember the user context between system calls, because it may handle system calls for several processes. The server processes are set up by the system administrator at initialization time. The problem with the transparent distributed architecture is that for each remote operation, process-specific information must be transmitted to the server process thus increasing the amount of information that must be communicated by packet. Another problem is in handling flow control since a server process is locked up waiting to finish the operation using a large number of server processes.

SUMMARY OF THE INVENTION

This invention is directed to solving these and other problems and disadvantages of the prior art. According to the invention, a program's execution is controlled by an extended process that spans a plurality of processors in a multiprocessor system. The extended process comprises an user process on one processor for executing the object code of the program and stub processes each on an individual one of the remaining processors for accessing system resources required for execution of the program. Each stub process gives the extended process access to the resources associated with the processor executing the stub process. Further, a stub process is unique to one particular extended process. Each stub process is interconnected to the user process by an individual virtual communication channel.

A method in accordance with the invention comprises the steps of: establishing a user process on a first processor, establishing a first stub process on a second processor to perform file, I/O, and other types of operations for only the user process, establishing a second stub process on a third processor to perform file, I/O, and other types of operations for only the user process, setting up a first communication channel between the user process and the first stub process, and setting up a second virtual communication channel between the user process and the second stub process.

The establishment of the user process involves in part creating a process control block, building a channel table having data structures to identify communication channels, building a link list to identify data structures in the channel table, and inserting a list pointer into the process control block to identify the link list. The setting up of the communication channels involves loading information into the link list and data structures of the channel table so as to identify the communication channels.

Advantageously, the first processor maintains a user file table in the process control block to identify files used by the user process and a system file table and an inode file table which together identify all files local to the first processor. Local files are accessed via the user, system, and inode file tables. A remote file is accessed by first identifying the communication channel that interconnects the user process with the stub process associated with the remote file via the user file table and channel table and then sending a packet to the stub process requesting that the stub process read the remote file. I/O type operations are handled in a similar manner. Other types of operations that are remote to the user process are performed by first accessing the channel table via the list pointer and link list to identify the communication channel that interconnects the user process to the stub process where the remote operation is to be performed and then sending a packet to that stub process requesting that the remote operation be performed.

DETAILED DESCRIPTION

Figure 1:
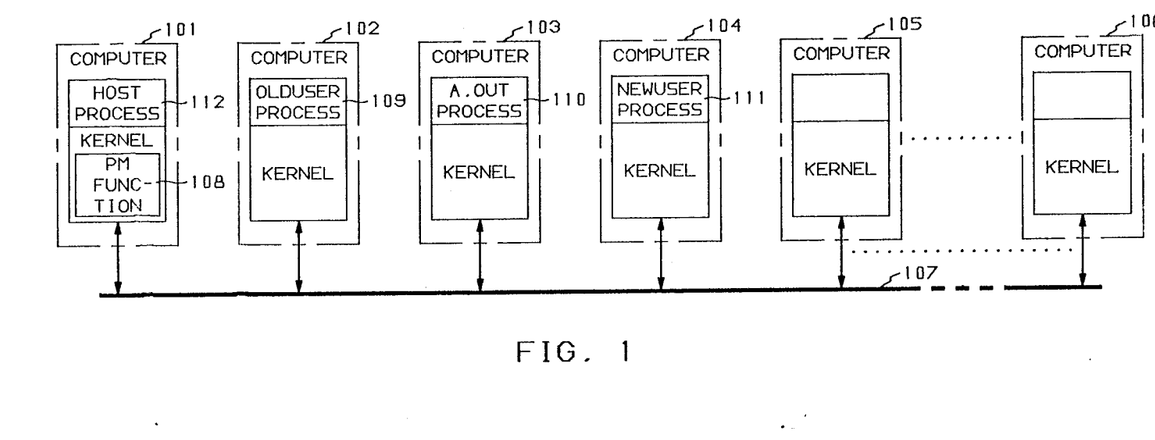
FIG. 1 illustrates, in block diagram form, a multiprocessor system for utilizing the present invention.

FIG. 1 shows a multiprocessor system having a plurality of computers 101 through 106 interconnected by bus 107. Some of the computers illustrated in FIG. 1 have particular functions. For example, computer 101 is considered to be the host computer, and computers 105 through 106 may be designated as computational servers or file servers. Each computer operates under control of an operating system kernel which illustratively is similar to the UNIX operating system described in an article by K. Thompson, "Unix Implementation" the Bell System Technical Journal, July-August, 1978, Volume 57, Number 6, and in a book by M. J. Bach entitled *The Design Of The Unix Operating System*, Prentice-Hall, 1986, Englewood Cliffs, N.J. Whereas the operating system kernel described by Thompson is restricted to only a single computer, the kernels of FIG. 1 allow a process to be extended over a number of computers. This extended process is a collection of individual special processes running on separate computers and is described in greater detail later in this section. These special processes are also referred to as primary or user and auxiliary or stub processes. Each kernel associated with the extended process maintains a distinct process necessary to allow the extended process to function on the computer controlled by the associated kernel. Each computer has associated memory and I/O devices; however, certain computers may be interconnected to special I/O devices such as telecommunication data interfaces or mass storage devices.

The initiation of a new program in the system illustrated in FIG. 1 results in that program being automatically assigned to an unspecified computer that has processing capacity to spare or which has special resources required by the program. The unspecified computer may be the same computer executing the request or a different computer. The execution of the program can be distributed over a number of computers utilizing one computer which has processing capacity and yet using one or more computers which have the necessary files or special I/O capabilities. When program execution is distributed, an extended process is created. The operation of the extended process so as to allow the execution of a program to be performed among a plurality of computers and yet making the existence of the extended process transparent to the application programmer is the subject of this invention.

In the previously referenced article by Thompson, it was noted that a process is a software unit which requires text, data and stack areas of memory and which is identified to the operating system by a process control block. In the operating system described by Thompson, the process control block is contained in one area of memory since that operating system is executed on a uniprocessor system. In the system illustrated in FIG. 1 for example, the process control block is distributed among all the computers which are associated with the extended process. The extended process comprises processes 112, 110, 111 and possibly processes located in computer 105 and 106 after an exec system call has finished initiating execution of the program. The extended process consists of a user process and a number of stub processes. The user process has text, data and bss areas of memory in addition to the process control block. A stub process contains only a portion of the process control block relating to operating system functions pertaining to that particular computer's operations with respect to the extended process as required at any point in time.

The extended process is an entity that dynamically adjusts to supply the required resources of the multiprocessor system to allow execution of the program. New stub processes are added to the extended process as other resources are required in different processors of the multiprocessor system. The kernel of the processor executing the user process of the extended process automatically detects the need to create a stub process when a system call is made by the user process requiring resources on a new processor. The user process's kernel then communicates with the kernel of the new processor to establish a stub process on the new processor. The establishment of a stub process also includes the creation of a virtual communication channel between the user process and the new stub process. Once established, subsequent communication flows between the user process and the stub process via the virtual channel.

As described in the article by Thompson, the execution of a new program on a single processor controlled by the Unix operating system is as follows. First, a fork system call is executed which replicates the executing process into child and parent processes. These processes share the same program, but have different data storage. The child process then executes an exec system call. The execution of the exec system call results in a new program being executed. To further understand the structure of the extended process, consider the following example which illustrates the initiation of a new program by the execution of the exec system call. The exec system call has been modified to allow for the execution of programs on a multiprocessor system. Olduser process 109, on computer 102, executes the exec system call. The end result is that the new program is eventually executed by newuser process 111 on computer 104. Initially, the file containing the new program is in the file system of computer 103 and is accessed by a.out process 110. Computers 105 and 106 also have resources that maybe utilized by newuser process 111.

Upon olduser process 109 executing the exec system call, the kernel of computer 102 transmits a packet to computer 103 to obtain the header portion of the a.out file via a.out process 110 so as to determine the type of resources required to execute this program. The allocation of resources and dynamic load balancing is performed by process manager (M) function 108 being executed by computer 101 which is designated as the host computer of the system of FIG. 1. The kernel of computer 102 then transmits a packet to process manager function 108 of computer 101 requesting allocation of resources for the execution of newuser process 111. In our present example, process manager function 108 transmits back a message designating that computer 104 is to execute newuser process 111. Further information concerning the operations of process manager function 108 is illustrated in the copending application of Bishop et al., Ser. No. 941,701. The kernel of computer 102 then transmits process control information to the kernel of computer 104 so that the latter kernel can setup newuser process 111 and stub processes in computers 102, 105, and 106 for the future execution of the extended process.

Once this initialization has been performed, the kernel of computer 102 passes the execution of the exec system call to the kernel of computer 104. The latter kernel obtains the a.out file from computer 103. The kernel of computer 104 also transmits messages to the kernels of the other computers informing them that the user process which was initially olduser process 109 has migrated to computer 104 and is now newuser process 111. Olduser process 109 now becomes a stub process. The kernels of the other computers will now direct any signals for olduser process 109 to newuser process 111. Further, the kernel of computer 104 transmits a message to the kernel of computer 102 to recover all signals transmitted to olduser process 109 that arrived at computer 102 before the other computers were informed that the extended process had migrated to computer 104. Once newuser process 111 has been set up and begins to execute, it can utilize the resources of the other computers as required via stub processes that were created in these computers. If, during the execution of the program, it is necessary to access a computer that was not initially designated as being part of the extended process, then the operating system of computer 104 requests the creation of a stub process on that computer necessary to continue execution of the program.

Figure 2:
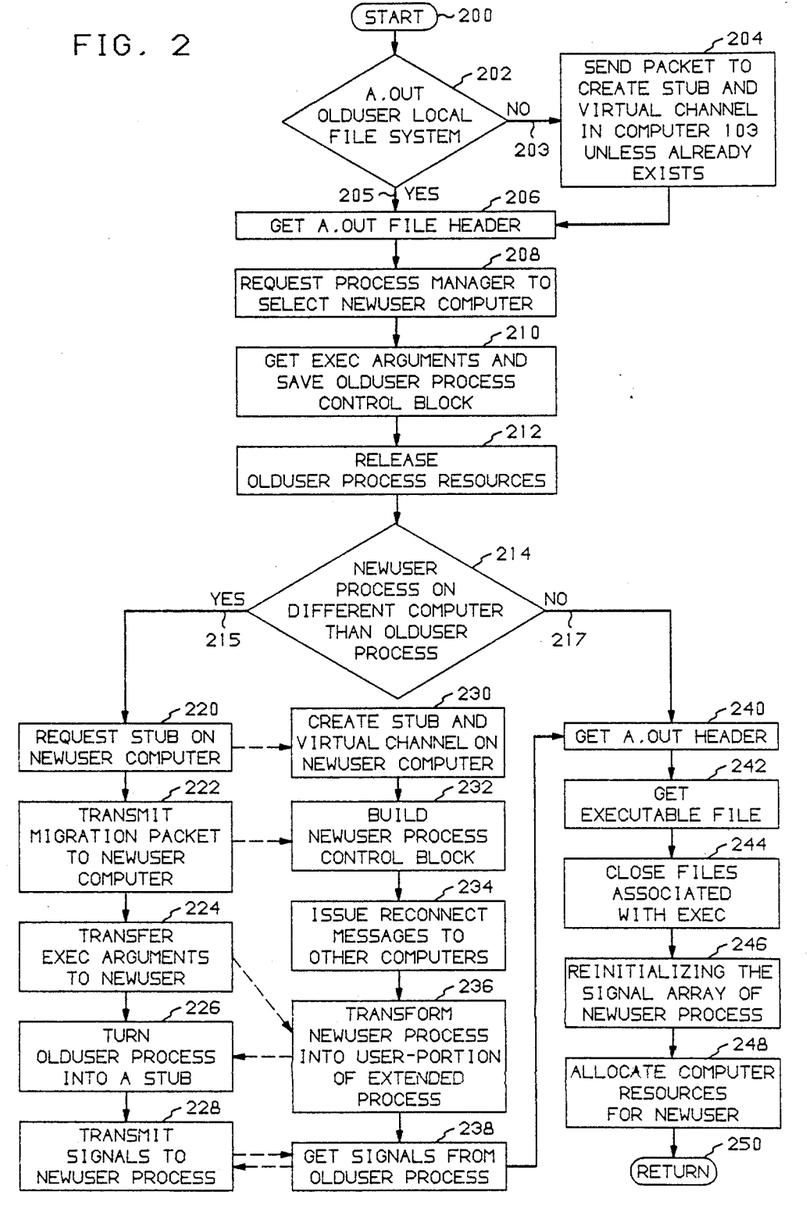
FIG. 2 illustrates, in flowchart form, the functions performed during the execution of an exec system call by the multiprocessor system of FIG. 1.

FIG. 2 illustrates in greater detail the execution of the exec system call and creation of the extended process for the present example. Upon execution of the exec system call by olduser process 109, decision block 202 is performed. The exec system call may specify parameters for influencing the processor assignment. Decision block 202 determines whether or not the file containing the a.out file is local to computer 102 or is on a remote computer. Since the file is on computer 103 in the present example, it is remote; and if a stub process does not already exist on computer 103 for the present extended process, a packet is sent to create a stub process on computer 103. In response to the packet, the kernel of computer 103 creates a.out process 110 that allows access to the a.out file. The a.out process 110 then becomes part of the extended process. Block 206 accesses the a.out file located on computer 103 via a.out process 110. The header information is read from the a.out file and is stored in the process control block of a.out process 110. The kernel of computer 103 then transmits a subset of the header to computer 102's kernel which stores the subset in the process control block of olduser process 109 in computer 102. The information obtained from the a.out file at this point specifies the size of the a.out file and may specify parameters for influencing the processor assignment decision. After obtaining the information from the a.out file, the kernel of computer 102 transmits a packet to the kernel of computer 101 requesting that the kernel execute process manager function 108 to select a computer upon which newuser process 111 is to assigned at block 208. This packet contains the information obtained from the a.out file in block 206 and any parameters regarding processor assignment in the exec system call. PM function 108 is responsive to this packet to validate an explicit assignment if one existed in the a.out or exec system call information or to perform a dynamic load balancing for the multiprocessor system illustrated in FIG. 1 in order to make a processor assignment for newuser process 111.

In the present example, newuser process 111 is assigned to computer 104.

Next, the kernel of computer 102 executes block 210. The execution of block 210 results in the arguments of the exec system call being read. The kernel of computer 102 is responsive to these arguments and any environment variables from the olduser process 109's address space to transfer this information into a system work area formatting this information into an initial stack for newuser process 111. Block 212 is next executed which releases the resources of olduser process 109 back to the operating system of computer 102. In particular, the address space of olduser process 109 is released.

The actions just performed represent a preexecution stage of the exec system call. If the newuser process is present on a different computer than the olduser process, then blocks 220 through 238 are executed before blocks 240 through 250. In the present example, the kernel of computer 102 executes blocks 220 through 228, and the kernel of computer 104 executes blocks 230 through 238. However, if the olduser and the newuser processes are on the same computer, then the blocks 240 through 250 illustrated in FIG. 2 are executed at this point in time. Decision block 214 determines whether or not the newuser and olduser processes are on different computers. In the present example, olduser process 109 is on computer 102 and newuser process 111 is on computer 104. If a stub process does not already exist on computer 104, the kernel of computer 102 executes block 220 which results in a packet being transmitted over to the kernel of computer 104. This packet requests that a stub process be created which will become newuser process 111 on computer 104. The kernel is responsive to this request to create a skeleton stub process by performing a kernel fork function on a prototype stub process. Each kernel of FIG. 1 maintains a copy of the prototype stub process for the purpose of creating stub processes. The kernel of computer 102 then executes block 222. The latter block results in the transmission of a migration packet from computer 102 to computer 104. The packet contains the initial process control information for newuser process 111. That information was formatted in block 210. The migration packet contains the information necessary to transform the stub for newuser process 111 on computer 104 into a viable user process of an extended process. Viability is defined here to mean that the newuser process has all the information necessary to exit or terminate gracefully if required. A graceful exit is one where all parts of the extended process can be removed from all the computers of FIG. 1 if it is necessary to terminate the extended process.

The principal information contained in the migration packet is the reconnection data for the stub processes and information defining open files of the extended process. This data is used to reattach the stub processes and files that had been attached to olduser process 109 to newuser process 111. The reattachment is performed by rearranging the virtual channels and discussed with respect to FIG. 3. Certain crucial data from the process control block defining process group ID, parent process ID, flagword, user ID, group ID, current directory, private root directory, new argument pointer, and various timekeeping fields are also communicated via the migration packet. The kernel of computer 104 is responsive to the migration packet from olduser process 109 to install the data contained in this packet in the newuser process 111's control block and to issue reconnect messages to all of the stub processes in the other computers. After block 232 and 234 have been performed, the newuser process 111 is considered viable.

The reconnect messages transmitted by block 234 to the other computers cause the kernels of these other computers to transform those computers'portion of the process control block of the extended process to now point to newuser process 111 in computer 104 rather than olduser process 109 in computer 102. The significance of this reconnection is that any signals generated for the extended process by stub processes of other computers are now transmitted to newuser process 111 rather than to olduser process 109.

The operating system of computer 102 now executes block 224 which results in the transfer of the exec arguments and other information to newuser process 111 via the kernel of computer 104 by a series of packets from the kernel of computer 102. The newuser process 111 is then built up by installing these packets into the newuser process 111 address space on computer 104 by the kernel of computer 104. This transforms the newuser process 111 into a more complete user process of the extended process.

The kernel of computer 104 then executes block 236 that sends a message to computer 102 causing the execution of block 226 which results in olduser process 109 being turned into a stub process. The kernel of computer 104 then transmits a request at block 238 to the kernel of computer 102 for all signals destined for the user process of the extended process that may be stored for olduser stub process 109 in computer 102. Computer 102's kernel responds to this message by executing block 228 which transmits these signals to block 238.

The kernel of computer 104 now executes the blocks 240 through 250 in FIG. 2. These latter blocks are executed in the same manner regardless of whether or not the olduser process and the newuser process are on the same computer. First, the kernel accesses the a.out file located on computer 103 via a.out process 110 to obtain the a.out header by execution of block 240. Utilizing the header information, the kernel of computer 104 builds the newuser process 111's address space, including space for text, data, and bss, by loading the various sections from the a.out file into computer 104 from computer 103 by execution of block 242.

After performing this function, the kernel then executes block 244 so as to close any files which were associated with olduser process 109 but will not be associated with newuser process 111.

Figure 4:
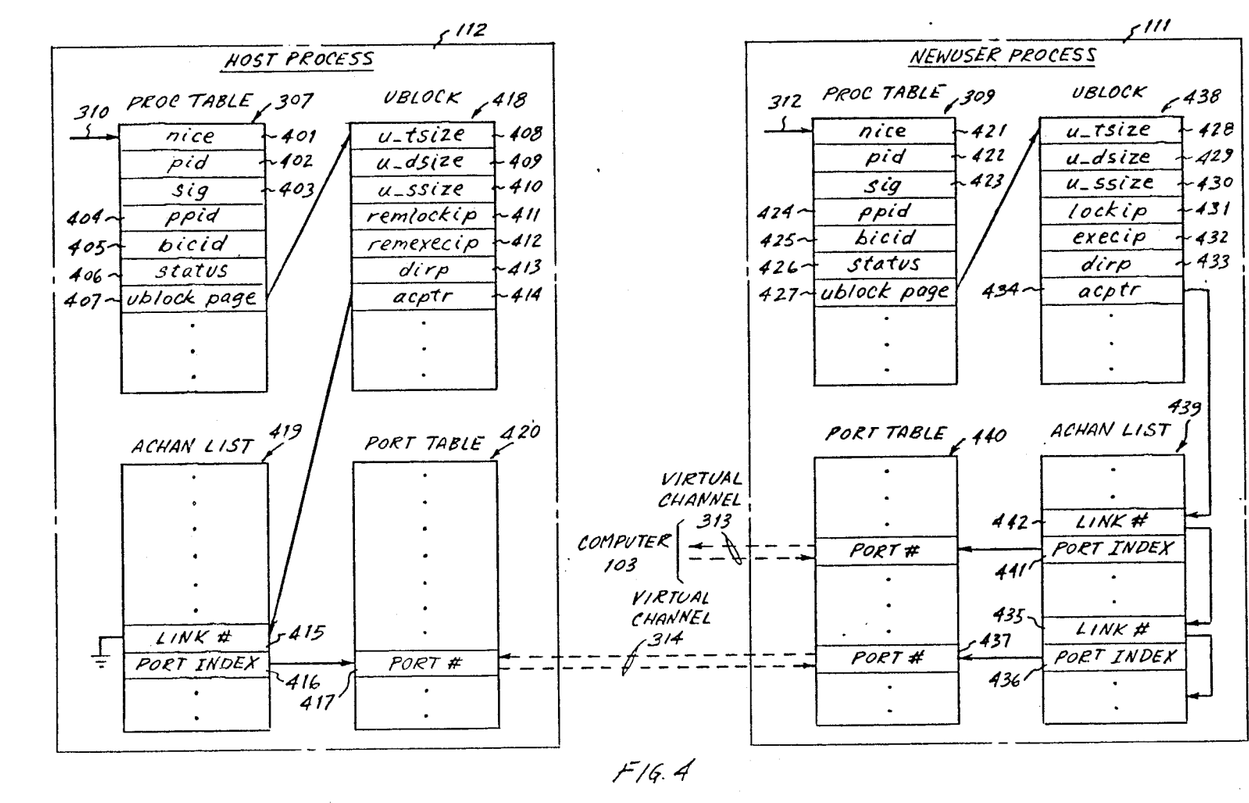
FIG. 4 illustrates, in greater detail, the software interconnection of FIG. 3.

The files that are to be closed are determined by the application programmer. The programmer marks the files to be closed in a standard UNIX manner using the fcntl system call prior to execution of the exec system call. This information is stored in the process control block of olduser process 109 and is later transferred to newuser process 111. After closing all of the marked files, the kernel of computer 104 executes block 246 so as to reinitialize the array of signal-handler fields which contain an entry defining the action to be taken upon receipt of a signal. Each entry can specify one of the following: default value, ignore value, and a pointer identifying a function that services that particular signal. The signals were transmitted from computer 102 to computer 104 in block 228 and combined with signal entry 423 in block 238. The block 246 sets all entries in the signal array pointing to functions to the default value but any entry that contains an ignore value is not modified. When a signal is received for a process, the kernel accesses the process control block for that process and stores the signal in the sig entry, such as entry 423 as illustrated in FIG. 4. When a signal is handled by the kernel, the signal number is used as an index to access the signal array. If the default value is accessed, the process will normally terminate. If the accessed entry contains the ignore value, no action is taken. If the accessed entry contains a pointer, then the function identified by the pointer is executed. When the application runs, the signal system call will be used to configure the array to the requirements of that program. Further information on the handling of signals can be found in the aforementioned book of Bach. Next, the kernel of computer 104 executes block 248 which reinitializes any memory management information required for newuser process 111's new address space and completes all other housekeeping chores. Finally, control is turned over to newuser process 111 so that the program can now execute at block 250.

Figure 3:
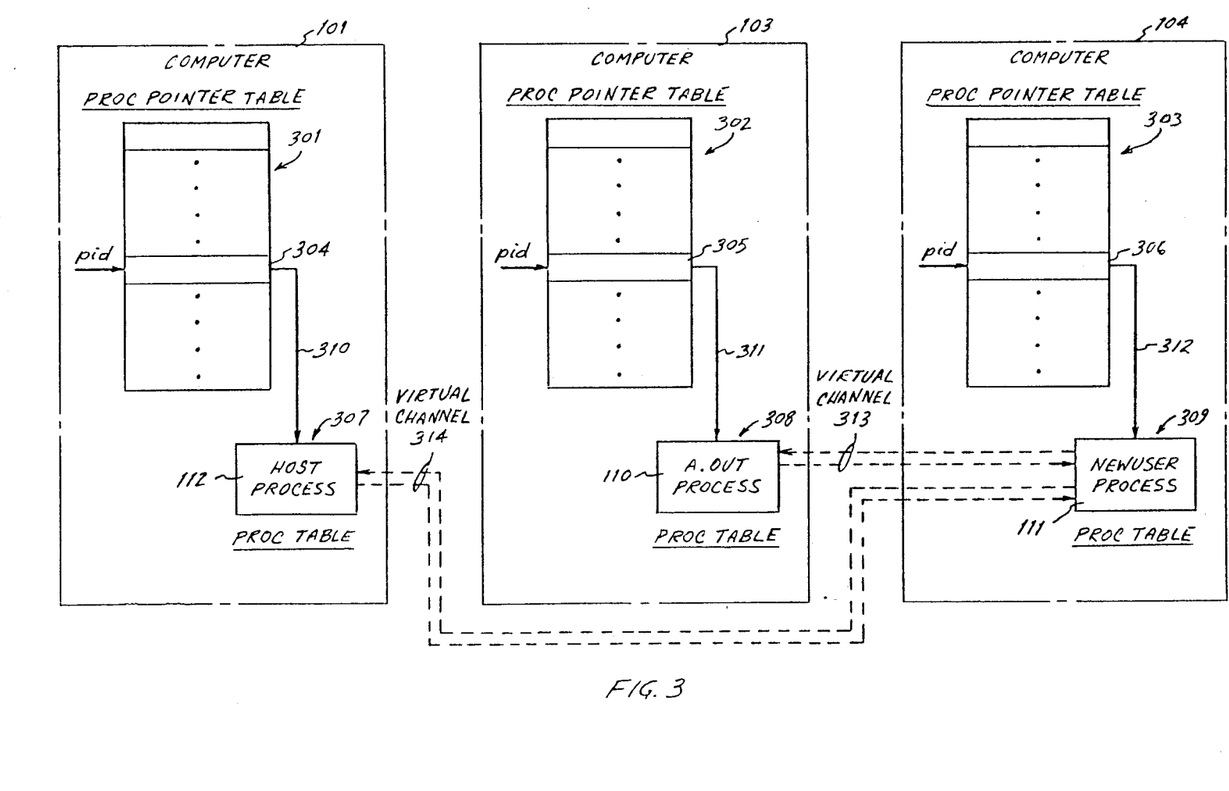
FIG. 3 illustrates, in block diagram form, the interconnection of an extended process for a subset of the processors of FIG. 1.

FIG. 3 illustrates in greater detail a portion of the extended process resulting from the execution of the exec system call. New process 111 is the user process of the extended process and processes 112 and 110 are stub processes of the extended process. All processes of the extended process share a common pid number. Virtual channels are established between the user process of the extended process and the stub processes at the time the stub processes are established. Those channels are utilized for the communication of packets between the user process and the stub processes. Stub processes of the extended process do not directly communicate with each other. In addition, all communication from other processes within the system illustrated in FIG. 1 are directed to the user process of the extended process. Each of the computers illustrated in FIG. 1 maintains a proc pointer table such as 301 through 303 of FIG. 3. The pid number is utilized by the kernel to point into a proc pointer table such as tables 301 through 303 to obtain the pointer such as 304 through 306 to find the designated process. For example, the pid number in computer 104 is used to access entry 306 from proc pointer table 303 that points to proc table 309 via path 312. Similarly, the pid number utilizes to access entry 304 of proc pointer table 301 to obtain path 310 to proc table 307.

Virtual channels 313 and 314 are directly associated with the processes. The identification of these channels is established within the proc table of the individual processes. A user process of the extended process has a virtual channel to each of the stub processes. However, each stub process of the extended process, such as host process 112, has only one virtual channel; and that channel is to the user process of the extended process, such as newuser process 111. Not only do the virtual channels allow the user process to access files and I/O devices attached to the processor executing the stub process, but also to perform other types of operations such as setting semaphores.

FIG. 4 illustrates in greater detail the memory utilized by host process 112 and newuser process 111 and further demonstrates the differences between a user and stub processes of the extended process. For each of the latter processes, portions of the proc table and the ublock are illustrated. In addition, the port tables and the achan lists are shown. These latter tables identify the virtual channels between the processes. Not illustrated for newuser process 111 are the text, data, and stack areas that are utilized by this process during execution. Similarly, the stack area of memory is not illustrated for host process 112 which is a stub process of the extended process. Newuser process 111 is the user process of the extended process.

Consider now in detail the entries of proc tables 307 and 309. The entries illustrated for tables 307 and 309 are only a portion of the entries that would exist in these tables. The nice entry 401 or 421 defines the scheduling priorities of a process. Nice entry 401 is fixed on a system-wide basis by the system administrator which is true for all stub processes. Since nice entry 421 is for a user process, it is adjustable by the user executing a specific system call allowing the level of priority to be reduced or by actions taken by the system administrator or superuser which can increase or decrease the level of priority. Entries 402 and 422, pid, define the process identification number which is the same for both entries. The pid number is given on an extended process basis so that the user process and all stub processes of the extended process have the same pid number.

The sig entries 403 and 423 coupled with the status entries 406 and 426 are used to handle signals between processes. In addition, the status word of the proc tables also contains conventional UNIX system type information. On a stub, the signals flags contained in the status word indicate whether or not a signal has been received from the user process which in the present example is newuser process 111. Host process 112 is responsive to the receipt of a signal that is stored in entry 403 to perform different operations depending on whether the present operation is interruptible or not. In newuser processor 111, the signal flags in status entry 426 are used to indicate whether a signal has been transmitted to host process 112. In addition, the signal flags in entry 426 also keep track of whether or not the message was ever sent to a stub process such as host process 112. This latter indication is utilized to facilitate cleanup of different types of operations at a latter point in time. The type of signal that is received is stored by newuser processor 111 in sig entry 423.

With respect to the parent pid (ppid) entries 404 and 424, these entries are used to keep track of the identity of the parent process of the extended process. This is a conventional UNIX system type field. However, in the extended process, the ppid entry is only valid on the process of the extended process that is being executed by host computer 101 which is host process 112 in the present example. Advantageously, this reduces the amount of communication of packets between various stubs and the user process of the extended process. The user process of the extended process does not have a valid ppid entry unless the user process of the extended process is resident on the host computer.

The bicid variable is used in the following manner to determine whether or not a particular process is a stub or user process of the extended process. Each processor of the multiprocessor system illustrated in FIG. 1 stores the processor's identification number in a variable MYLOC whose contents is the identification number of the processor. Regardless of whether it is a stub or user process, the bicid variable always contains the identification number of the processor that is executing the user process of the extended process. In the present example, this is computer 104. Entry 425 is identical to the contents of the MYLOC variable maintained by the kernel of computer 104. Entry 405 also contains the contents of the MYLOC variable of computer 104 hence does not match the MYLOC variable of computer 101. The kernel of a particular computer determines whether or not it is executing the user or stub process by comparing its bicid variable with the MYLOC variable. If a match results, then the kernel is executing the user process of the extended process.

The ublock page entries 407 and 427 contain address information to setup a virtual address to gain access to the ublocks which are illustrated as ublocks 418 and 438 in FIG. 4. The latter ublocks contain different information depending on whether the ublock is the stub process of the extended process, such as host process 112, or the user process of the extended process, such as newuser process 111. Advantageously, many of the entries of these ublocks are similar to those for the ublocks for the UNIX system described in the aforementioned article by Thompson. Entries 408, 409, and 410 contain zero for the host process 112 since a stub process of the extended process has no text, stack or data memory areas. When the kernel is performing functions associated with the stub process, the kernel maintains a kernel stack unique to that stub process in the ublock of the stub process. This is similar to the manner in which the kernel stack is maintained in a single processor UNIX system when the process is executing in the kernel mode. Entries 428, 429 and 430 contain the necessary information so that the user process of the extended process, newuser process 111, has a text area, data area and a stack for the execution of the program that was obtained from the a.out file as described earlier.

In the user process of the extended process, the variables lockip and execip, entries 431 and 432, respectively, are used to identify the old and new a.out files. In the present example, computer 103 is storing the new a.out, and computer 103 is storing the old a.out file. Entry 431 points to the old a.out file, and entry 432 points to the new a.out file which is executed as a result of the exec system call. If both files are local to the processor executing the user process of the extended process, then these entries are pointers which point into the inode table maintained by the kernel of the local processor in a standard UNIX system manner to identify the local files. The system file table is not used since the a.out files are not used by the process directly but rather by the kernel. However, if the file is remote, e.g. associated with another processor, the entry contains an identification of an entry in the user process port table such as port table 440. For example, this entry in port table 440 then identifies the virtual channel and remote entries such as 411 or 412 are identified in a stub process of the extended process. For example, if entry 431 indicates a remote file, then it points to a corresponding entry 411 in the stub process associated with the processor that is local to the remote file. More information concerning these entries is given with respect to FIG. 6.

In general, the ublock of a stub process of the extended process contains three types of entries with respect to the ublock of the user process. The first type is entry 408 which is never used in the stub process but is used in the normal way in the user process. The second type of entry in the ublock of the stub process is an entry which is always used, and an example of this is the acptr entry 414 which is described in greater detail later in this section. The third type of entry in the ublock of the stub process is an entry which is only populated as needed with the necessary information being transferred over from the user process of the extended process when the requesting packet to perform a particular function is transmitted from the user process to the stub process. One example of this is the dirp entry 413, and other examples are entries 411 and 412. The entry 413 is a pointer which points to the path name. In the user process of the extended process, this entry always points into the users address space to designate the path name. However, in a stub process, the information concerning the path name is received from the user process and is then stored by the kernel at a convenient location. At this point and time, the kernel sets the dirp entry to point to the path name. An example of when the path name is transmitted is during an open system call. Since the open system call is executed on the processor executing the user process of the extended process, the path name information is not available on the stub process.

The acptr entries 414 and 434 point to the achan list 419 and 439, respectively. An achan list of a user process may have a multitude of structures each defining a virtual channel to a stub process. In the present example, newuser process 111's achan list 439 has a number of structures with each defining a virtual channel to a stub process of the extended process. Each structure comprises link and port pointers and other information for virtual channel operation. These structures are linked together by the link pointers 442 and 435 in a link list. The list is terminated upon the contents of the last link pointer being a null. The virtual channels are identified by the port pointers. The port pointers 431 and 436 point into port table 440. The newuser process 111 identifies the virtual channels associated with it by utilizing acptr entry 434 to point into the link list associated with newuser process 111 in achan list 439. The port pointers then are utilized to access port table 440. Host process 112 similarly has acptr entry 414 which points into the structures containing pointers 415 and 416 of achan list 419. Since a stub process of the extended process can never have more than one virtual channel, the link pointer 415 terminates the link list since the contents of pointer 415 are null. Port number 417 defines virtual channel 314 to newuser process 111. Further detail concerning the virtual channels is given in the copending application of Bishop et al., Ser. No. 941,702 which is hereby incorporated by reference.

Consider the virtual channels in light of blocks 234 and 236 of FIG. 2. When the reconnection information is initially transmitted by block 234, the stub processes of the extended process have virtual channels set up with olduser process 109 which at that point in time is the user process in a similar manner as illustrated in FIG. 4. Upon receiving the reconnect information, each receiving kernel updates the port table and the other channel information resulting in the stub process'virtual channel being connected to newuser process 111 rather than olduser process 109. Part of operations performed by block 236 is to transform achan list 439 and port into the tables illustrated in FIG. 4. Block 226 changes olduser process 109's tables into tables similar to those illustrated for host process 112 in FIG. 4.

Virtual channels are located in two different ways depending on whether the operation being requested is related to a file or I/O operation or to a non-file or non-I/O operation. The following description of FIG. 5 details how virtual channels are located when a file operation is being requested. For I/O requested operations, a similar procedure is followed. For other types of operations such as a semaphore related operation system call, the kernel responding to the system call accesses the acptr pointer and use the latter pointer to access the port pointer in the port table via the achan list. The port pointer identifies the virtual channel.

Figure 5:
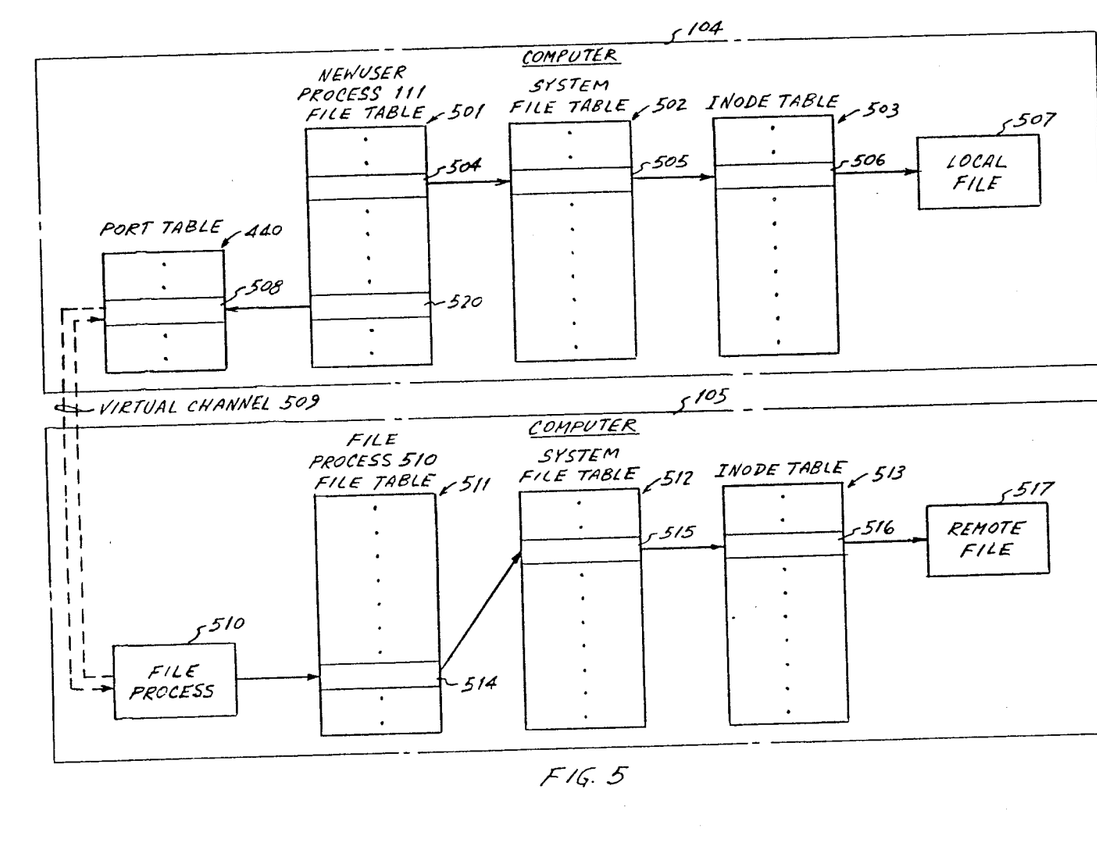
FIG. 5 illustrates, in block diagram form, the file control structure for an extended process executing on the processors of FIG. 1.

FIG. 5 illustrates the manner in which the files of the extended process are identified by the user process of the extended process. If a file is local to the processor that is executing the user process of the extended process, such as computer 104 and newuser process 111, then the standard UNIX system file control structure is utilized. For example, local file 507 is identified via entry 504 of file table 501. The latter table is part of the ublock of newuser process 111 and is referred to as the u_ofile structure. The contents of entry 504 in turn identify entry 505 of system file table 502. The system file table 502 is then utilized to point to inode table 503 and entry 506. Entry 504 is identified in table 501 by using the file descriptor number associated with file 507 in a normal UNIX system manner. Entry 506 then identifies the local file 507 in a normal UNIX system manner. If the file is remote such as remote file 517, which is assumed to be local to computer 105, then entry 520 identifies that this file is remote and rather than pointing into system file table 502 points into port table 440. The file descriptor number for file 517 is used to access entry 520. Entry 508 is identified in table 440 by entry 520 of port table 440 which identifies virtual channel 509. Virtual channel 509 is interconnected as previously described into file process 510 which is a stub process of the extended process. A packet containing the file descriptor number for file 517 is transmitted to the kernel of computer 105. The latter kernel uses the file descriptor number to identify entry 514 of file table 511 which is in the ublock of file process 510. The file control structure then identifies remote file 517 in a normal UNIX manner via entries 515 and 516 in tables 512 and 513, respectively.

Figure 6:
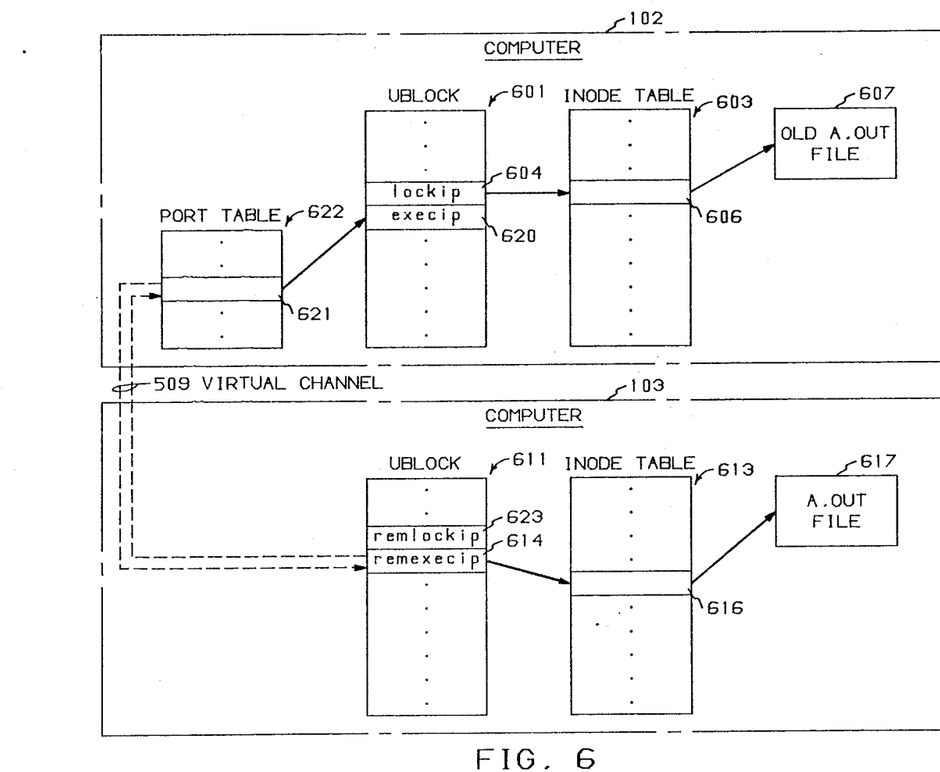
FIG. 6 illustrates, in block diagram form, the file control structure for accessing a.out files for an extended process executing on the processors of FIG. 1.

FIG. 6 illustrates in greater detail the utilization of the lockip and execip variables in the user process of the extended process and the remlockip and remexecip variables in a stub process of the extended process. FIG. 6 shows that the state of the multiprocessor system illustrated in FIG. 1 before the execution of block 224 of FIG. 2. At this time, the user process of the extended process is olduser process 109 being executed by computer 102. FIG. 6 assumes that the original a.out file which was used to execute the exec system call, is local to computer 102. In the present example, the original a.out file is old a.out file 607. The new a.out file from which the new program is to be obtained is remote and is associated with computer 103. This file is denoted as a.out file 617. The stub process of the extended process being executed on computer 103 is a.out process 110. Illustrated for olduser process 109 is its ublock 601 and port table 622. Illustrated for a.out process 110 is its ublock 611. Entry 604 of ublock 601 of olduser process 109 identifies old a.out file 607 in a standard UNIX system manner utilizing entries 604 of ublock 601 and entry 606 of inode table 603. Since the lockip variable identifies a local file, there is no corresponding remlockip variable used in any stub process associated with the extended process.

The new a.out file, however, is remote from computer 102. Entry 620 of ublock 601 rather than pointing into inode table 603 points to entry 621 in port table 622. Entry 621 identifies virtual channel 509 which is connected to ublock 611 of a.out process 110. Entry 614 of ublock 611 then points entry 616 of inode table 613 to a.out file 617. Since the old a.out file is local to computer 102, entry 623, remlockip variable, is not utilized in ublock 611.

It is to be understood that the above-described embodiment is merely illustrative of the principles of the invention and that other arrangements may be devised by those skilled in the art without departing from the spirit and scope of the invention.

What is claimed is:

1. A method for controlling the execution of a program in a multiprocessor system having a plurality of processors and a communication path interconnecting said plurality of processors, comprising the steps of:
establishing a user process on first one of said processors;
said step of establishing said user process comprises the substeps of
creating a process control block;
creating text and data and stack areas of memory to be identified by said process control block
building a channel table having data structures to identify communication channels;
building a link list to identify data structures in said channel table;
inserting a list pointer into said process control block to identify said link list;
establishing a first stub process on a second one of said processors to be used only by said user process during the execution of file and I/O and other operations of said program;
said step of establishing said first stub process comprises the substeps of
creating a process control block for said first stub process; and
creating a stack area of memory for said first stub process to be identified by said process control block for said first stub process;
establishing a second stub process on a third one of said processors to be used only by said user process during the execution of file and I/O and other operations by said program;
said step of establishing said second stub process comprises the substeps of
creating a process control block for said second stub process;
and creating a stack area of memory for said second stub process to be identified by said process control to solving these and block for said second stub process;
setting up a first virtual communication channel between said user process and said first stub process via said communication path; and
setting up a second virtual communication channel between said user process and said second stub process via said communication path.

2. The method of claim 1 wherein said step of setting up said first virtual communication channel comprises the steps of
loading information into one of said data structures of said table to identify said first communication channel; and
loading a first channel pointer into said link list to identify said one of data structures.

3. The method of claim 1 wherein said step of setting up said second channel comprises the steps of
loading information into another one of said data structures to identify said second communication channel; and loading a second channel pointer into said link list to identify said other one of said data structures.

4. The method of claim 2 wherein said first one of said processors maintains a user file table unique to said user process in said process control block for identifying files used by said user process and said user file table having a plurality of entries each designating one of said files of said user process and an inode table for identifying local files of said one of said processors and said inode table having a plurality of entries and a system file table having plurality of entries each identifying one of said entries of said inode table, said method further comprises, in order to perform file operations for said user process with a remote file associated with said first stub process and a local file associated with said user process, the steps of:

accessing said local file by determining one of said entries in said user file table identifying said local file;

using the contents of the determined entry of said user file table to determine an entry in said system file table used to identify said local file;

using the contents of the determined entry of said system file table for determining an entry in said inode table identifying said local file;

reading said local file in response to the contents of the determined entry in said inode file;

accessing said remote file by determining another one of said entries in said user file table identifying said remote file;

using the contents of the determined entry of said user file to determine said one of said data structures in said channel table thereby identifying said first virtual communication channel;

transmitting a packet via said first virtual communication channel to said first stub process and said packet containing information requesting that said remote file be read; and reading said remote file by said first stub process in response to the information of said packet.

5. The method of claim 4 wherein said second one of said processors maintains another user file table unique to said first stub process in another process control block maintained for said first stub process for identifying files used by said user process on said second one of said processors and said other user file table having a plurality of entries each designating one of a plurality remote files of said second one of said processors with said remote file being one of said files of said second one of said processors and said other inode table having a plurality of entries and another system file table having a plurality of entries each identifying one of said entries of said other inode table said step of reading said remote file by said first stub process comprises the steps of:

accessing said remote file in response to said information of said packet by determining one of said entries in said other user file table identifying said remote file;

using the contents of the determined entry of said other user file table to determine an entry in said other system file table used to identify said remote file;

using the contents of the determined entry of said other system file table for determining an entry in said other inode table identifying said remote file; and reading said remote file in response to the contents of the determined entry in said other inode file.

6. The method of claim 5 wherein said step of accessing said remote file by determining one of said entries in said user file table comprises the steps of:

maintaining a file descriptor number identifying said remote file in said user file table;

indexing into said user file table with said file descriptor number to identify said one of said entries in said other user file table;

said step of transmitting said packet comprises the step of inserting into said information the file descriptor number; and said step of accessing said remote file comprises the step of indexing into said other user file table with said file descriptor number to identify said remote file.

7. The method of claim 4 wherein said user process performs one of said other operations in said second one of said processors by performing the steps of:

accessing said channel table to identify said one of said virtual communication channels;

transmitting another packet via said first virtual communication channel requesting that said one of said other operations be performed by said first stub process; and performing said requested one of said other operations in response to said other packet by said first stub process.

8. The method of claim 7 where said step of accessing said channel table comprises the steps of:

identifying said link list using said list pointer;

using said first channel pointer from said link list to identify said one of said data structures; and utilizing the contents of said one of siad data structures to identify said first communication channel via said channel table.

9. An apparatus for controlling the execution of a program in a multiprocessor system having a plurality of processors and a communication path interconnecting said plurality of processors, comprising:

means for establishing a user process on a first one of said processors;

said establishing means of said user process comprises means for creating a process control block;

means for creating text and data and stack areas of memory to be identified by said process control block;

said user process establishing a means further comprises means for building a channel table having data structures to identify communication channels;

said user process establishing means further comprises means for building a link list to identify data structures in said channel table;

said user process establishing means further comprises means for inserting a list pointer into said process control block to identify said link list;

means for establishing a first stub process on a second one of said processors to be used only by siad user process during the execution of file and I/O and other operations by said program;

said means for establishing said first stub process comprises means for creating a process control block for said first stub process; and means for creating a stack area of memory for said first stub process to be identified by said process control block for said first stub process;

means for establishing a second stub process on a third one of said processors to be used only by said user process during the execution of file and I/O and other operations by said program;

said step of establishing said second stub process comprise
  means for creating a process control block for said second stub process; and
  means for creating a stack area of memory for said second stub process to be identified by said process control block for said second stub process;
  means for setting up a first virtual communication channel between said user process and said first stub process via said communication path; and
  means for setting up a second virtual communication channel between said user process and said second stub process via said communication path.

10. The apparatus of claim 9 wherein said setting up means of said first virtual communication channel comprises
  means for loading information into one of said data structures of said table to identify said first communication channel; and
  means for loading a first channel pointer into said link list to identify said one of data structures.

11. The apparatus of claim 9 wherein said setting up means of said second channel comprises
  means for loading information into another one of said data structures to identify said second communication channel; and
  means for loading a second channel pointer into said link list to identify said other one of said data structures.

12. The apparatus of claim 10 wherein said first one of said processors maintains a user file table unique to said user process in said process control block for identifying files used by said user process and said user file table having a plurality of entries each designating one of said files of said user process and an inode table for identifying local files of said one of said processors and said inode table having a plurality of entries and a system file table having plurality of entries each identifying one of said entries of said inode table, said apparatus further comprises, in order to perform file operations for said user process with a remote file associated with said first stub process and a local file associated with said user process, comprises:
  means for accessing said local file by determining one of said entries in said user file table to identify said local file;
  means for using the contents of the determined entry of said user file table to determine an entry in said system file table used to identify said local file;
  means for using the contents of the determined entry of said system file table for determining an entry in said inode table to identify said local file;
  means for reading said local file in response to the contents of the determined entry in said inode file;
  means for accessing said remote file by determining another one of said entries in said user file table to identify said remote file;
  means for using the contents of the determined entry of said user file to determine said one of said data structures in said channel table thereby identifying said first virtual communication channel;
  means for transmitting a packet via said first virtual communication channel to said first stub process and said packet containing information requesting that said remote file be read; and
  means for reading said remote file by said first stub process in response to the information of said packet.

13. The apparatus of claim 12 wherein said second one of said processors maintains another user file table unique to said first stub process in another process control block maintained for said first stub process for identifying files used by said user process on said second one of said processors and said other user file table having a plurality of entries each designating one of a plurality remote files of said second one of said processors with said remote file being one of said files of said second one of said processors and said other inode table having a plurality of entries and another system file table having a plurality of entries each identifying one of said entries of said other inode table said reading means of said remote file comprises:
  means for accessing said remote file in response to said information of said packet by determining one of said entries in said other user file table identifying said remote file;
  means for using the contents of the determined entry of said other user file table to determine an entry in said other system file table used to identify said remote file;
  means for using the contents of the determined entry of said other system file table for determining an entry in said other inode table identifying said remote file; and
  means for reading said remote file in response to the contents of the determined entry in said other inode file.

14. The apparatus of claim 13 wherein said accessing means of said remote file by determining one of said entries in said user file table, comprises:
  means for maintaining a file descriptor number identifying said remote file in said user file table;
  means for indexing into said user file table with said file descriptor number to identify said one of said entries in said other user file table;
  said transmitting means of said packet comprises means for inserting into said information the file descriptor number; and
  said accessing means of said remote file comprises means for indexing into said other user file table with said file descriptor number to identify said remote file.

15. The apparatus of claim 12 wherein said user process performs one of said other operations in said second one of said processors and said apparatus further comprises:
  means for accessing said channel table to identify said one of said virtual communication channels;
  means for transmitting another packet via said first virtual communication channel to request that said one of said other operations be performed by said first stub process; and
  means for performing said requested one of said other operations in response to said other packet by said first stub process.

16. The apparatus of claim 15 where said accessing means of said channel table comprises:
  means for identifying said link list using said list pointer;
  means for using said first channel pointer from said link list to identify said one of said data structures; and
  means for utilizing the contents of said one of said data structures to identify said first communication channel via said channel table.

* * * * *